United States Patent [19]
Belsan et al.

[11] Patent Number: 5,632,012
[45] Date of Patent: May 20, 1997

[54] DISK SCRUBBING SYSTEM

[75] Inventors: Jay S. Belsan, Nederland; Alan R. Permut, Louisville; George A. Rudeseal, Boulder, all of Colo.

[73] Assignee: Storage Technology Corporation, Louisville, Colo.

[21] Appl. No.: 611,501

[22] Filed: Mar. 6, 1996

Related U.S. Application Data

[63] Continuation of Ser. No. 384,446, Feb. 2, 1995, abandoned, which is a continuation of Ser. No. 157,895, Nov. 24, 1993.

[51] Int. Cl.$^6$ .................................................. G06F 11/10
[52] U.S. Cl. ......................................................... 395/182.04
[58] Field of Search ........................... 395/182.04, 182.01; 371/40.1, 40.2, 10.2; 364/266.3, 267.91, 266.5, 970

[56] References Cited

U.S. PATENT DOCUMENTS

| | | | |
|---|---|---|---|
| 4,964,129 | 10/1990 | Bowden, III et al. | 371/40.2 |
| 4,964,130 | 10/1990 | Bowden, III et al. | 371/40.2 |
| 5,077,737 | 12/1991 | Leger et al. | 371/10.1 |
| 5,088,081 | 2/1992 | Farr | 369/54 |
| 5,146,571 | 9/1992 | Logan | 395/400 |
| 5,148,432 | 9/1992 | Gordon et al. | 371/10.1 |
| 5,155,835 | 10/1992 | Belsan | 395/425 |
| 5,210,866 | 5/1993 | Milligan et al. | 395/575 |
| 5,258,984 | 11/1993 | Menon et al. | 371/10.1 |
| 5,263,032 | 11/1993 | Porter et al. | 371/40.2 |
| 5,267,242 | 11/1993 | Lavallee et al. | 371/10.1 |
| 5,271,018 | 12/1993 | Chan | 371/10.2 |
| 5,301,297 | 4/1994 | Menon et al. | 395/425 |
| 5,303,244 | 4/1994 | Watson | 371/10.1 |
| 5,313,626 | 5/1994 | Jones et al. | 395/575 |
| 5,403,639 | 4/1995 | Belsan et al. | 395/600 |

*Primary Examiner*—Robert W. Beausoliel, Jr.
*Assistant Examiner*—Stephen C. Elmore
*Attorney, Agent, or Firm*—Duft, Graziano & Forest, P.C.

[57] ABSTRACT

One or more background processes that references data storage volumes and cylinders that are to be scrubbed to ensure the integrity of the data stored thereon. A priority scrubbing process is also available to note data storage volumes that have recently had data written thereon by the host processor and which require a more timely review of the data than less frequently used volumes.

36 Claims, 13 Drawing Sheets

DISK SCRUBBING SYSTEM

This application is a file wrapper continuation of application Ser. No. 08/384,446, filed Feb. 2, 1995, now abandoned, which is a file wrapper continuation of application Ser. No. 08/157,895, filed Nov. 24, 1993.

FIELD OF THE INVENTION

This invention relates to a data storage subsystem that dynamically and periodically reviews the integrity of the data records stored on the disk drive devices and reconstructs any corrupted data found thereon.

PROBLEM

It is a problem in the field of computer systems to provide an inexpensive, high performance, high reliability memory that can both store large quantities of data and efficiently process changes to and create copies of the data records stored therein. One data storage subsystem used for this purpose makes use of a multiplicity of small form factor disk drives interconnected in a parallel array. The plurality of disk drives are divided into a number of redundancy groups, each of which includes a plurality of disk drives to spread the data transfers across all disk drives within the redundancy group rather than writing data to a single disk drive. A predetermined portion of the disk storage space in each redundancy group is used to store redundancy data to protect the integrity of the data stored in the redundancy group in the event of the failure of one or more of the physical disk drives included therein.

A significant difficulty with disk drive array data storage subsystems is that any read-after-write operation to ensure the integrity of the data that is written on to the disk drives of a redundancy group consumes a significant amount of data processing time and adversely impacts performance. The read-after-write operation occurs in synchronization with the write operation, implemented immediately after the write operation. If the host processor executes a number of successive writes to the same data record on the data storage subsystem, each write is immediately followed by a read-after-write operation. The interruption of successive write operations to perform a read-after-write adds a significant processing burden on the data storage subsystem. There is no capability to perform a single verification operation at the conclusion of the multiple successive write operations, even if the successive write operations function to write successive blocks of a single data file.

An alternative is to not verify the data that is written. A problem with this operation is that errors that occur during the data write process as well as errors that occur between successive reads of the stored data go undetected. Correction of these errors must wait until the data is requested by a host processor, at which time the error detection and correction processes required to restore the data have a significant negative impact on the host processor operation. In addition, if errors occur on too many drives in the redundancy group, the system may not be able to reconstruct the data using the redundancy information that is stored in the redundancy group.

An alternative data integrity maintenance system is disclosed in U.S. Pat. No. 5,210,860 which discloses an intelligent disk array controller. This controller activates a data read subroutine during periods of no data read/write activity to sequentially read each memory location in the disk array memory. The read operation determines whether each memory location can be read, and any detected errors are corrected as they are identified. This operation sequentially cycles through all memory locations on all disk drives in the system. A problem with this system is that recently written memory locations are not read until the system cycles through its predetermined sequence of disk drives. In addition, if there is a significant amount of data read/write activity, this single verification process can take a substantial amount of time before verifying the data written on the disk drives. Furthermore, unused portions of memory are checked as part of the sequence, such as spare drives. This process is therefore an improvement but suffers from a number of performance impediments.

SOLUTION

The above described problems are solved and a technical advance achieved in the field by the disk scrubbing system for a data storage subsystem. This system avoids the data integrity problems of the prior art by periodically verifying the integrity of the data stored on the disk drives of the data storage subsystem. This is accomplished by one or more background processes that cycle through predetermined segments of active memory to verify the integrity of the data stored therein. A priority scrubbing queue is also available to note data storage locations that have recently had data written thereon by the host processor and which require a more timely review of the data than the data storage locations that have not had data written therein since the last periodic data scrubbing operation.

The disk drives in a disk drive array data storage subsystem are configured into a plurality of variable size redundancy groups of N+M parallel connected disk drives to store data thereon. The disk drive array data storage subsystem dynamically maps between three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. A controller in the data storage subsystem operates to effectuate the dynamic mapping of data among these abstract layers and to control the allocation and management of the actual space on the physical devices. These data storage management functions are performed in a manner that renders the operation of the disk drive array data storage subsystem transparent to the host processor which perceives only the virtual image of the data storage subsystem.

When data is written to available memory space on a disk drive in a redundancy group, the physical tracks on which the data is stored are grouped together into logical cylinders and are noted in the logical cylinder table as containing newly-written data. A priority scrub routine sequences through all newly written physical tracks in the logical cylinder to verify the integrity of the data stored in the physical tracks by performing a data readback and error check operation. The priority scrub routine operates to perform a timely read and verify after write operation to detect and correct errors created during the data write process. A plurality of concurrently operational periodic disk scrub routines periodically sequences through all physical tracks in the data storage subsystem which contain customer or redundancy data to perform a data readback and error check operation on these physical tracks. The active data stored in the data storage subsystem is thereby routinely checked to ensure the integrity of this data.

DETAILED DESCRIPTION OF THE DRAWING

Figure 1:
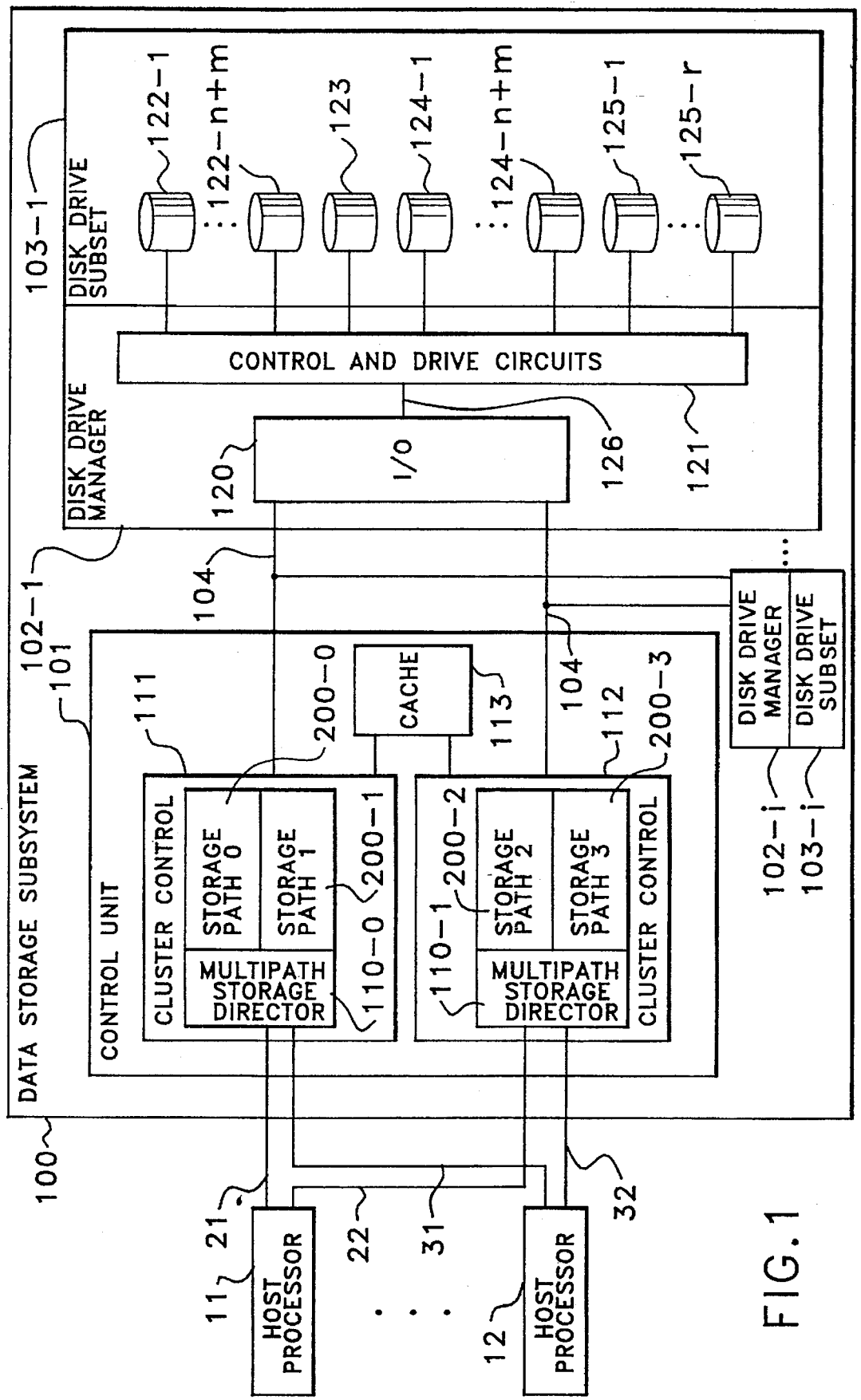
FIG. 1 illustrates in block diagram form the architecture of the disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives. The plurality of disk drives in the disk drive array data storage subsystem are configured into a plurality of variable size redundancy groups of N+M connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives.

The disk drive array data storage subsystem includes a controller that dynamically maps between three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor fixed block architecture (FBA) disk drives. The controller effectuates the dynamic mapping of data among these abstract layers and controls the allocation and management of the actual space on the physical devices. These data storage management functions are performed in a manner that renders the operation of the data storage subsystem transparent to the host processor, which perceives only the virtual image of the data storage subsystem.

The performance of this system is enhanced by the use of a cache memory with both volatile and non-volatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement algorithms, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N−1 other physical tracks to form the N data segments of a logical track.

The original, unmodified data that is still stored in a redundancy group is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than as on-demand processes. This arrangement avoids the parity update problem of existing disk drive array systems and improves the response time versus access rate performance of the data storage subsystem by transferring these overhead tasks to background processes.

Data Storage Subsystem Architecture

FIG. 1 illustrates in block diagram form the architecture of the preferred embodiment of the disk drive array data storage subsystem 100. The disk drive array data storage subsystem 100 appears to the associated host processors 11–12 to be a collection of large form factor disk drives with their associated storage control, since the architecture of disk drive array data storage subsystem 100 is transparent to the associated host processors 11–12. The disk drive array data storage subsystem 100 includes a plurality of disk drives (ex 122-1 to 125-r) located in a plurality of disk drive subsets 103-1 to 103-i.

The architecture illustrated in FIG. 1 is that of a plurality of host processors 11–12 interconnected via the respective plurality of data channels 21, 22–31, 32, respectively to a data storage subsystem 100 that provides the backend data storage capacity for the host processors 11–12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21–22, 31–32 that interconnect data storage subsystem 100 with the plurality of host processors 11, 12.

Control unit 101 includes two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel (for example 21) from any host processor (for example 11) to interconnect to a selected cluster control 111 within control unit 101. The cluster control 111 itself provides a pair of storage paths 200-0, 200-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101. The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored. Thus, data storage subsystem 100 can emulate one or more large form factor disk drives (for example—an IBM 3390-3 type of disk drive) using a plurality of smaller form factor disk drives while providing a high reliability capability by writing the data across a plurality of the smaller form factor disk drives.

Control Unit

Figure 2:
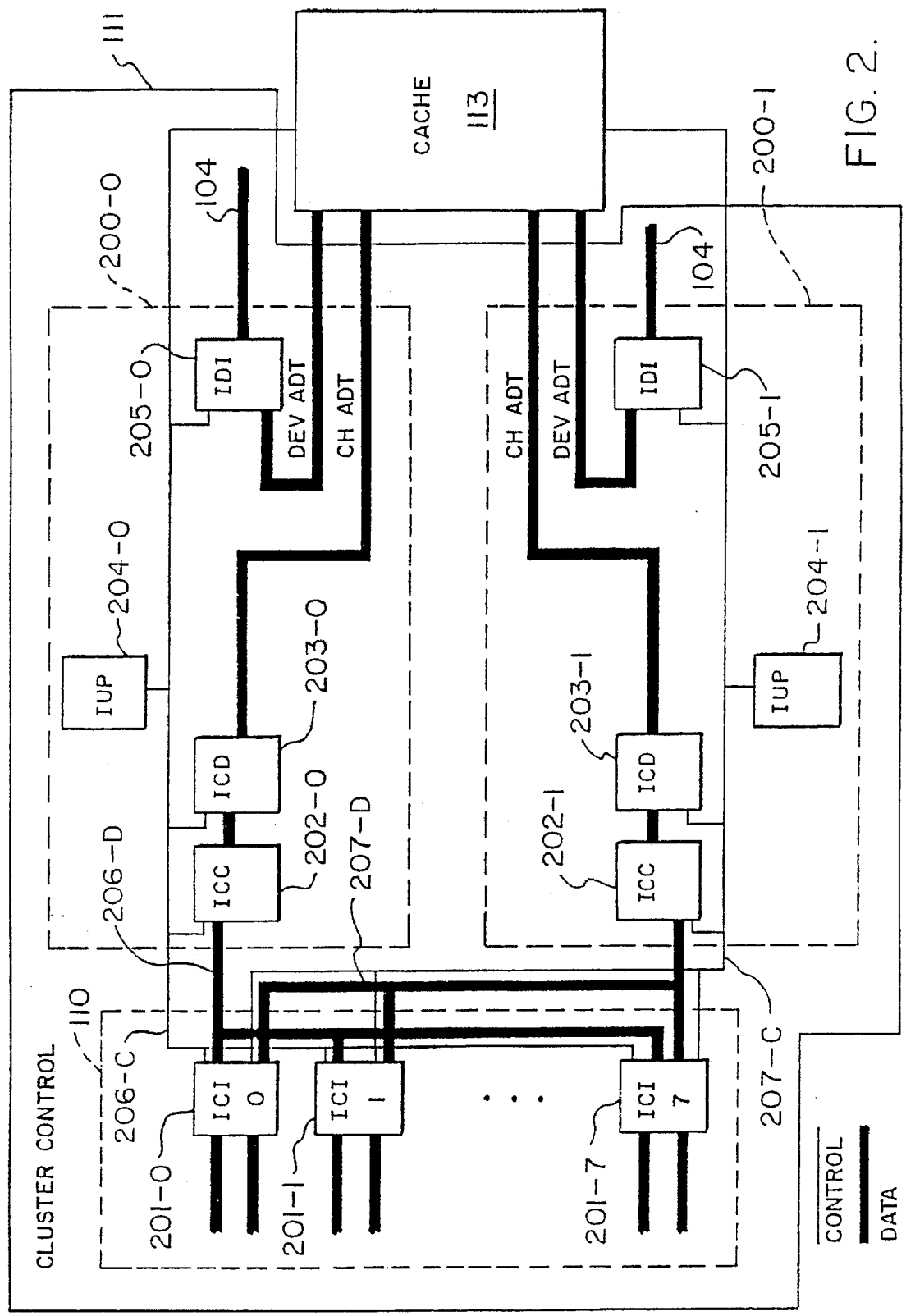
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Disk Drive Manager

Figure 3:
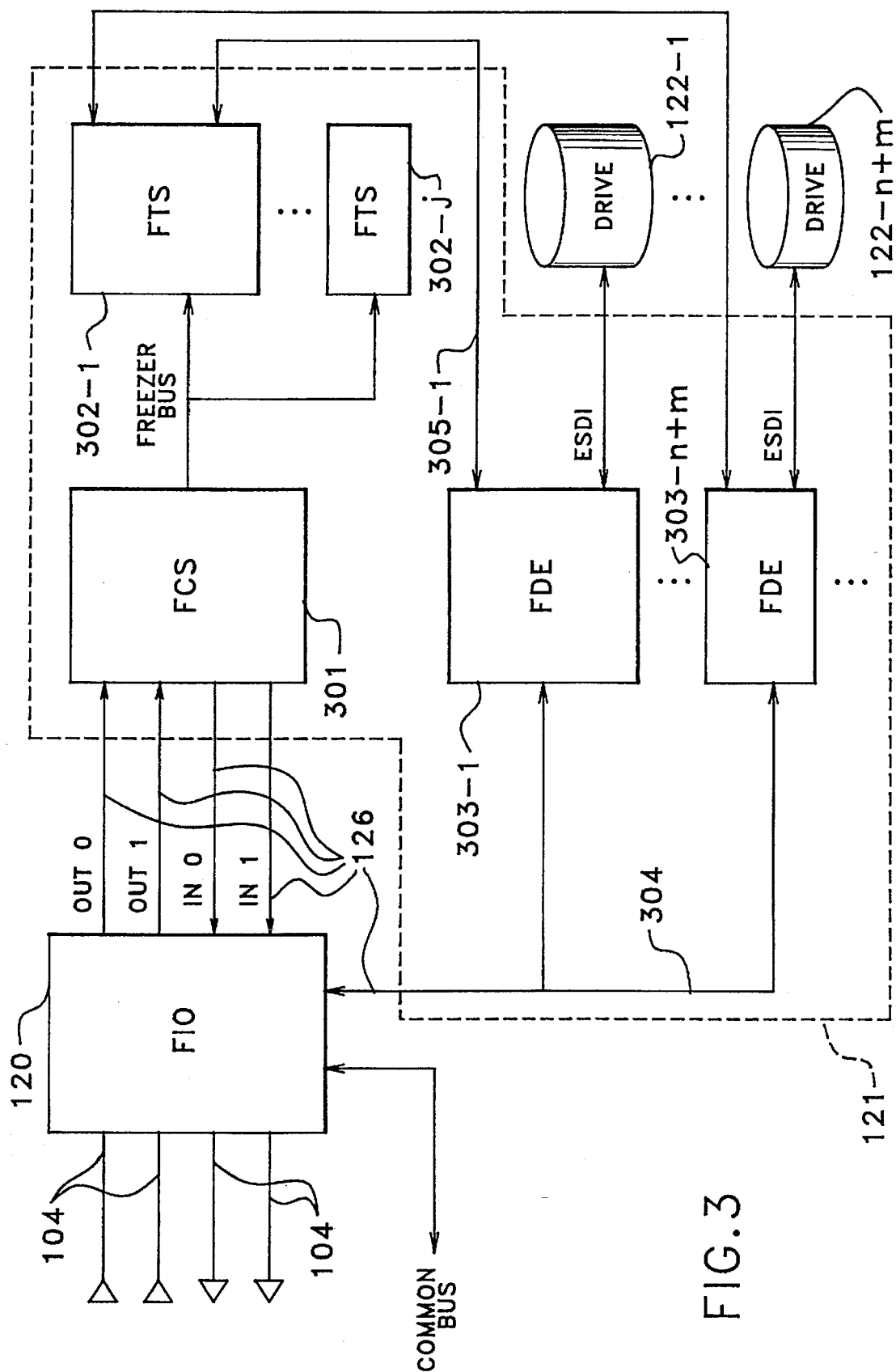
FIG. 3 illustrates the disk drive control circuits.

FIG. 3 illustrates further block diagram detail of disk drive manager 102-1. Input/output circuit 120 is shown connecting the plurality of optical fiber channels 104 with a number of data and control busses that interconnect input/output circuit 120 with control and drive circuits 121. Control and drive circuits 121 consist of a command and status circuit 301 that monitors and controls the status and command interfaces to the control unit 101. Command and status circuit 301 also collects data from the remaining circuits in disk drive managers 102 and the various disk drives in disk drive subsets 103 for transmission to control unit 101. Control and drive circuits 121 also include a plurality of drive electronics circuits 303, one for each of the commodity disk drives that is used in disk drive subset 103-1. The drive electronics circuits 303 control the data transfer to and from the associated commodity drive via an ESDI interface. The drive electronics circuit 303 is capable of transmitting and receiving frames on the serial interface and contains a microcontroller, track buffer, status and control registers and industry standard commodity drive interface. The drive electronics circuit 303 receives data from the input/output circuit 120 via an associated data bus 304 and control signals via control leads 305. Control and drive circuits 121 also include a plurality of subsystem circuits 302-1 to 302-j, each of which controls a plurality of drive electronics circuits 303. The subsystem circuit 302 controls the request, error and spin up lines for each drive electronics circuit 303. Typically, a subsystem circuit 302 interfaces with thirty-two drive electronics circuits 303. The subsystem circuit 302 also functions to collect environmental sense information for transmission to control unit 101 via command and status circuit 301. Thus, the control and drive circuits 121 in disk drive manager 102-1 perform the data and control signal interface and transmission function between the commodity disk drives of disk drive subset 103-1 and control unit 101.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

When the host processor 11 transmits data over the data channel 21 to the data storage subsystem 100, the data is transmitted in the form of the individual records of a virtual track. In order to render the operation of the disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the disk drive array data storage subsystem 100 in order to create entirely free logical cylinders. In order to evenly distribute data transfer activity, the tracks of each virtual device are scattered as uniformly as possible among the logical devices in the disk drive array data storage subsystem 100. In addition, virtual track instances are padded out if necessary to fit into an integral number of physical device sectors. This is to ensure that each virtual track instance starts on a sector boundary of the physical device.

Mapping Tables

Figure 4:
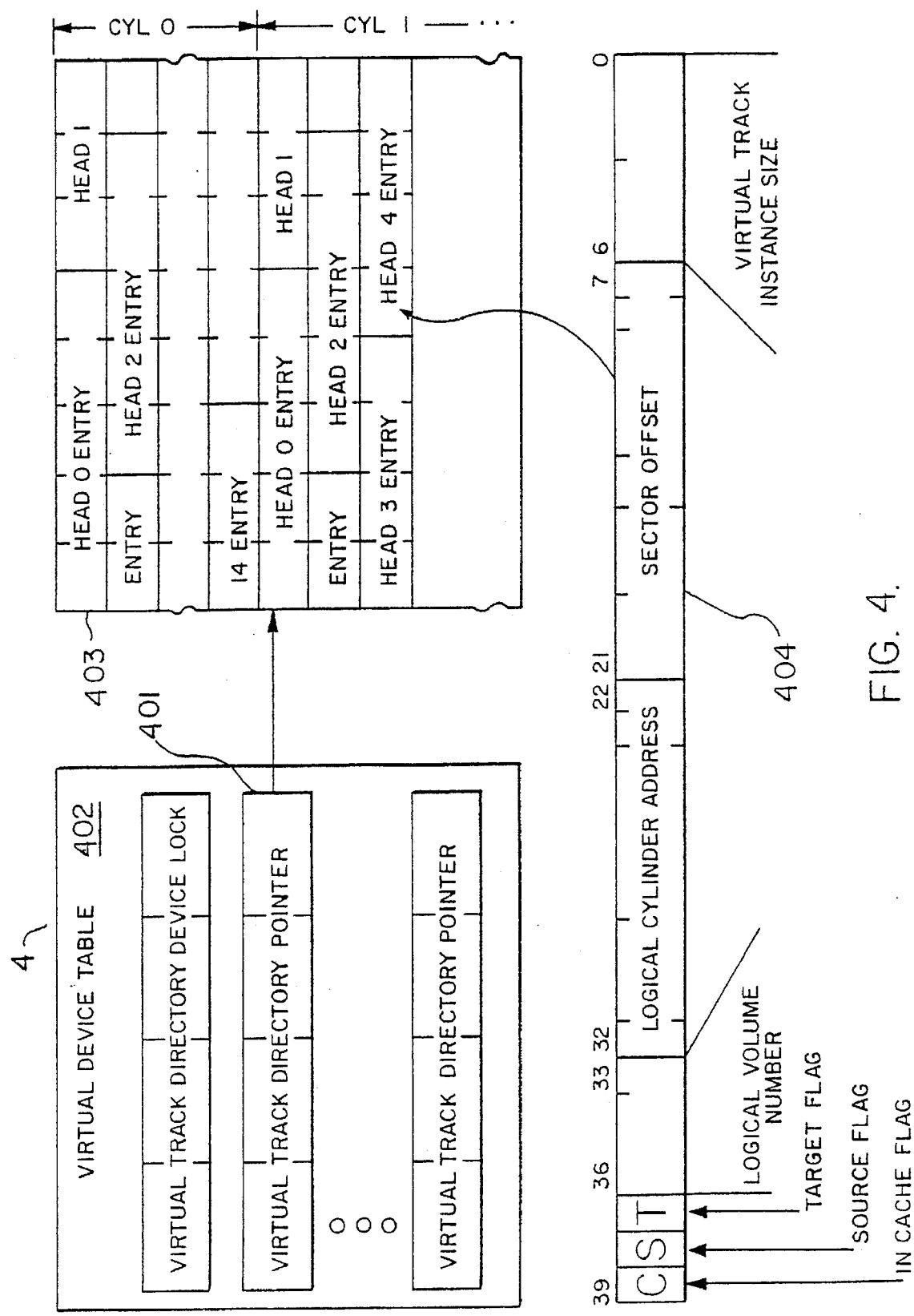
FIG. 4 illustrates the virtual track directory.

It is necessary to accurately record the location of all data within the disk drive array data storage subsystem 100 since the data received from the host processors 11–12 is mapped from its address in the virtual space to a physical location in the subsystem in a dynamic fashion. A virtual track directory is maintained to recall the location of the present instance of each virtual track in disk drive array data storage subsystem 100. Changes to the virtual track directory are journaled to a non-volatile store and are backed up with fuzzy image copies to safeguard the mapping data. The virtual track directory 4 consists of an entry 400 (FIG. 4) for each virtual track which the associated host processor 11 can address. The virtual track directory entry 400 also contains data 407 indicative of the length of the virtual track instance in sectors. The virtual track directory 4 is stored in noncontiguous pieces of the cache memory 113 and is addressed indirectly through pointers in a virtual device table. The virtual track directory 4 is updated whenever a new virtual track instance is written to the disk drives.

The storage control also includes a free space directory 800 (FIG. 8) which is a list of all of the logical cylinders in the disk drive array data storage subsystem 100 ordered by logical device. Each logical device is cataloged in a list called a free space list 801 for the logical device; each list entry represents a logical cylinder and indicates the amount of free space that this logical cylinder presently contains. This free space directory contains a positional entry for each logical cylinder; each entry includes both forward 802 and backward 803 pointers for the doubly linked free space list 801 for its logical device and the number of free sectors contained in the logical cylinder. Each of these pointers 802, 803 points either to another entry in the free space list 801 for its logical device or is null. In addition to the pointers and free sector count, the free space directory also contains entries that do not relate to free space, but relate to the logical cylinder. There is a flag byte known as the logical cylinder table (LCT) which contains, among other flags, a C flag and some T flags. The C flag indicates that the logical cylinder has been written to and requires priority scrubbing. The T flags indicate states of the logical cylinder when the logical cylinder should not be scrubbed, such as logical cylinder is being written, logical cylinder is being free space collected, and logical cylinder is being reconstructed. The collection of free space is a background process that is implemented in the disk drive array data storage subsystem 100. The free space collection process makes use of the logical cylinder directory, which is a list contained in the last few sectors of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Read Operation

Figure 6:
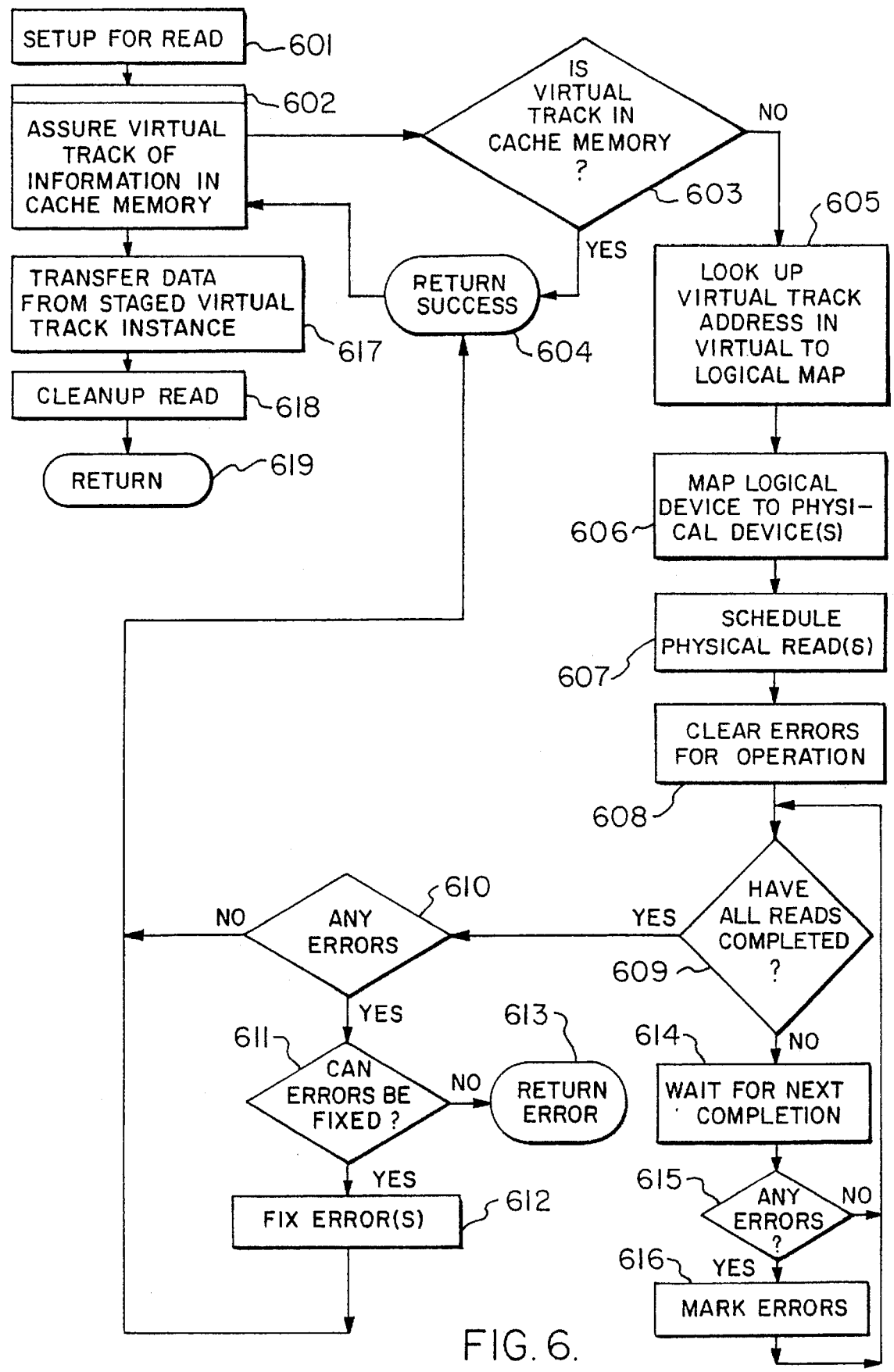
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605–616 is terminated.

Assume, for the purpose of this description, that the virtual track that has been requested is not located in the cache memory 113. Processing proceeds to step 605 where the control unit 101 looks up the address of the virtual track in the virtual to logical map table. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
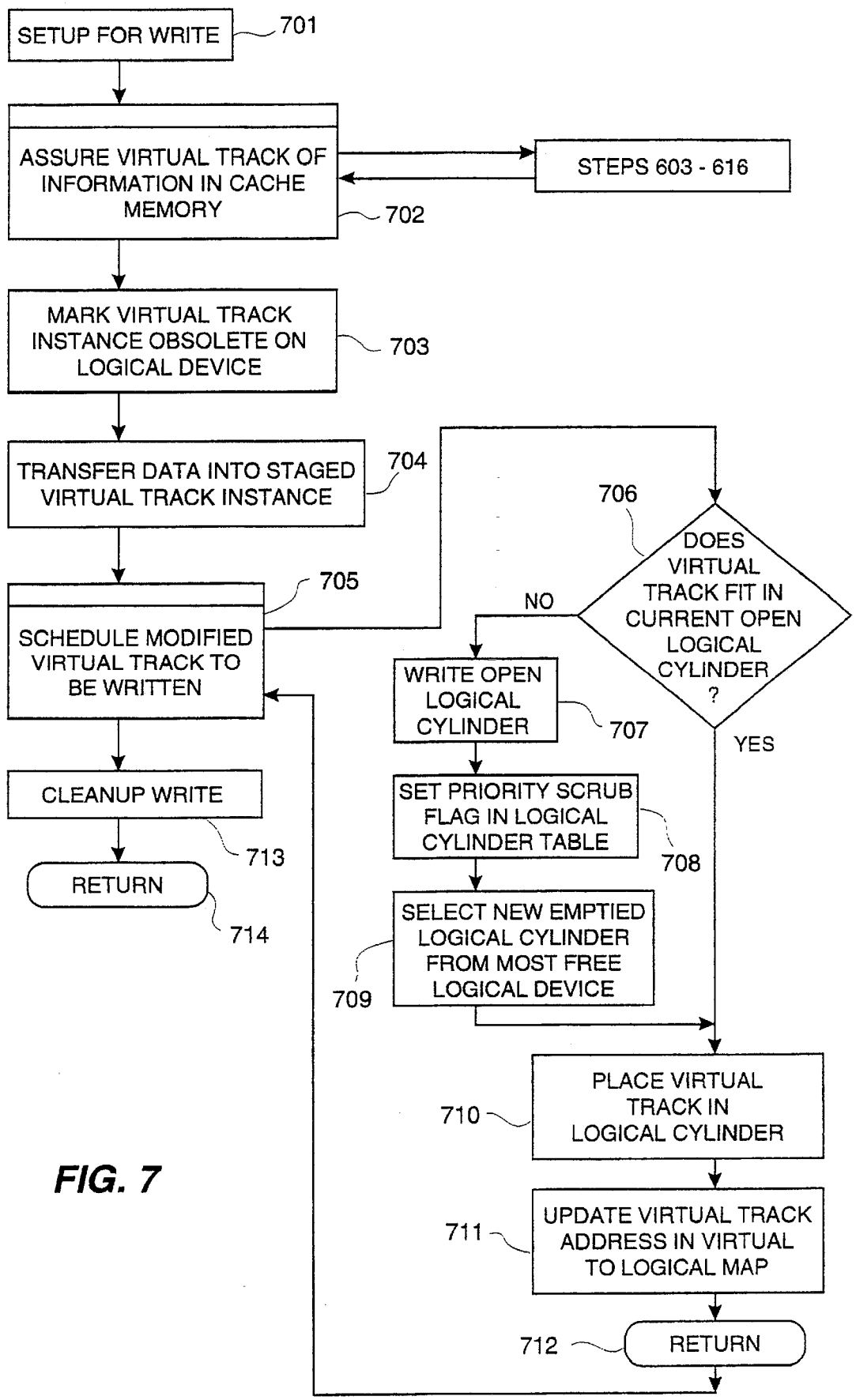

FIG. 7 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed. Some of the special handling required for sources and targets that was described earlier happens in this cleanup step. At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603–616 illustrated in FIG. 6 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11–12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the disk drive array data storage subsystem 100.

This scheduling is accomplished by the subroutine that consists of steps 706–712. At step 706, the control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the disk drive array data storage subsystem 100. Since this logical cylinder is newly written, at step 708 the priority scrub flag is set in the logical cylinder table to indicate that this logical cylinder requires immediate scrubbing. At step 709, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 710, the control unit 101 writes the updated virtual track instance into the logical cylinder and at step 711 waits to fill a logical cylinder. When the logical cylinder is written, the logical cylinder table is updated, including the setting of a flag bit to indicate that priority scrub is needed on that logical cylinder. At step 712, control returns to the main routine, where at step 713 the control unit 101 cleans up the remaining administrative tasks to complete the write operation and return to an available state at 714 for further read or write operations from host processor 11.

Free Space Collection

Figure 8:
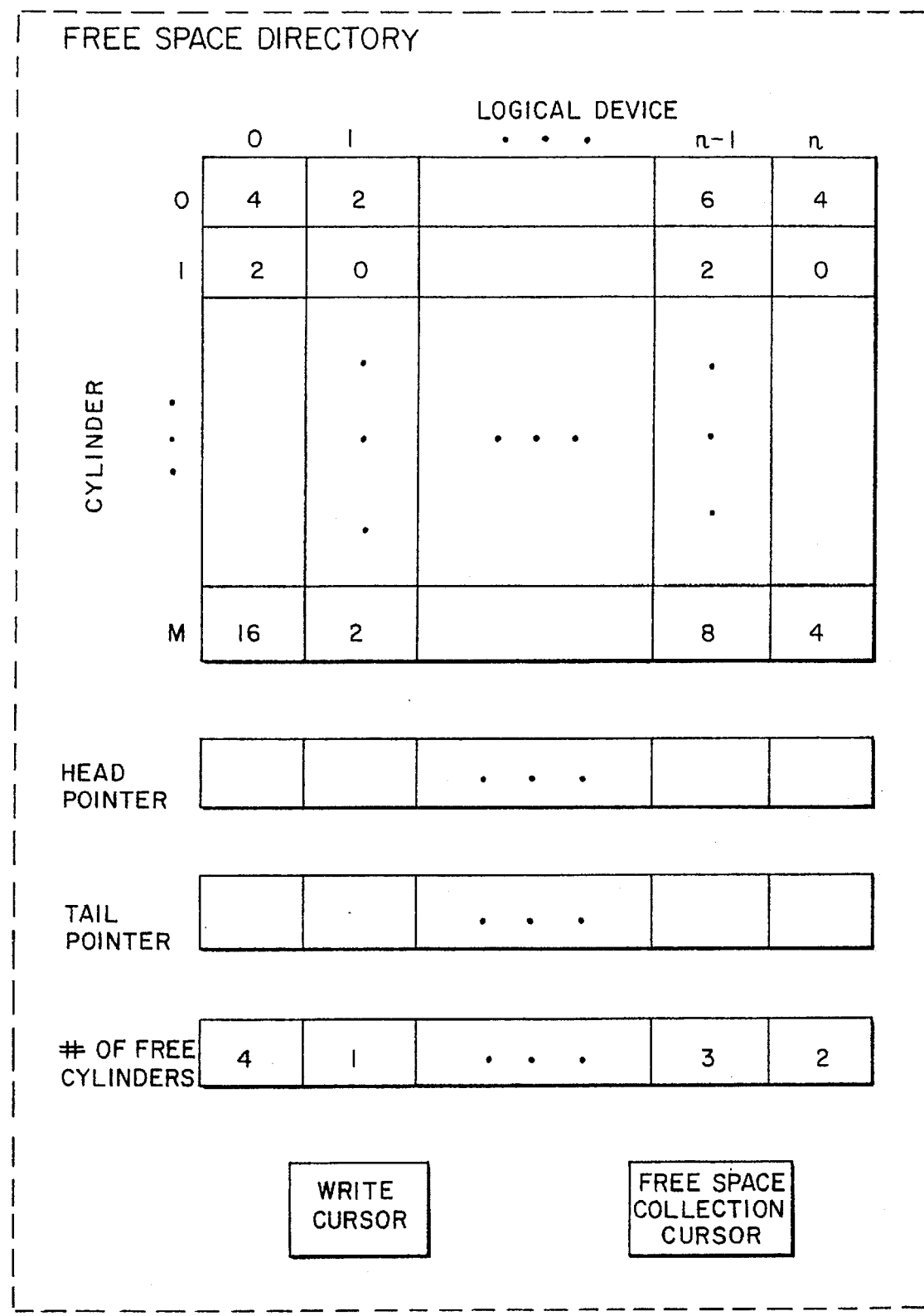
FIG. 8 illustrates the free space collection directory.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to completely empty logical cylinders for destaging, the valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11–12 or as part of a free space collection process. In addition, a free space collection cursor is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty, since all of the virtual track instances therein are tagged as obsolete. Additional logical cylinders are collected for free space collection purposes or as data is received from an associated host processor 11–12 until a complete logical cylinder has been filled. Once a complete logical cylinder has been filled, a new previously emptied logical cylinder is chosen.

Disk Scrubbing Architecture

The data storage subsystem 100 presumes that the data is accurately written onto the disk drives in the redundancy group. There is no read back after write process that verifies the integrity of the data record that is written onto the disk drives. Absent any data verification procedure, the integrity of this data record written into a redundancy group is not verified until the data storage subsystem 100 stages the data record from the disk drives on which it is written into the cache memory 113 for retrieval by the requesting host processor 11. In addition, errors in the data that are written on the disk drive can occur at random due to a number of causes in the interval of time between the original writing of the data record onto the disk drives and the retrieval of the data record from the disk drives. These random errors can occur as a result of noise, marginal media conditions, etc. and would not be detected if there were a read back after write procedure since they would occur in some random fashion over time after the data record has been written onto the disk drive. Therefore, the disk scrubbing system of the present invention functions to detect and correct errors that occur in the data write process as well as randomly over time thereafter. Scrubbing of the disk drives in a disk drive array is important since an N+M redundancy system must detect and correct errors before more than M disk drives containing data fail. If more than M disk drives fail, the errors become unrecoverable since there is not enough redundancy data to reconstruct the data located on the failed disk drives. Therefore, it is desirable to scrub the disk drives within the time interval that represents the mean time of probability of the occurrence of M disk drive failures within a redundancy group. The selected cycle time of the periodic disk scrubbing procedures is therefore based on the reliability of the disk drives and the number of disk drives in a redundancy group.

The disk scrubbing process includes at least one periodic disk scrubbing process 501,502 as well as a priority disk scrubbing process 510. Each of these disk scrubbing processes 501, 502, 510 entails reading the stored data from the disk drive and verifying the cyclic redundancy check (CRC) data produced by the disk drive by comparison to the CRC data previously recorded when the data was written to verify the accuracy of the data that is written thereon and the ability to accurately read the data therefrom. The reading of the data from the disk drives and the generation of the CRC data is accomplished by the disk drive subsystem. In order to minimize the probability that an error that occurs during the initial writing of the data on the disk drive is an unrecoverable error, it is advantageous to scrub the disk drive data records which have just been written in order to detect any unrecoverable errors as quickly as possible since it may be more probable that the permanent errors occur at the time data is written, than at some random time thereafter. Since the data record may not be retrieved for an extensive period of time thereafter, delaying the verification of data that is written on a disk drive increases the probability that the data must be reconstructed from the redundancy data stored in the redundancy group while the processor waits for this process to complete. Therefore, the disk scrubbing system of the present invention includes a priority scrub routine 510 that checks the integrity of data that has just been written on the disk drives on a priority basis rather than waiting for the periodic disk scrubbing procedures 501, 502 to sequence through the disk drives and verify in due course the integrity of the data that was just written. In addition, in order to expedite the process of periodic disk scrubbing, a plurality of operationally independent periodic disk scrubbing procedures 501, 502 can be extant in the data storage subsystem 100.

Periodic Disk Scrubbing

Figure 5:
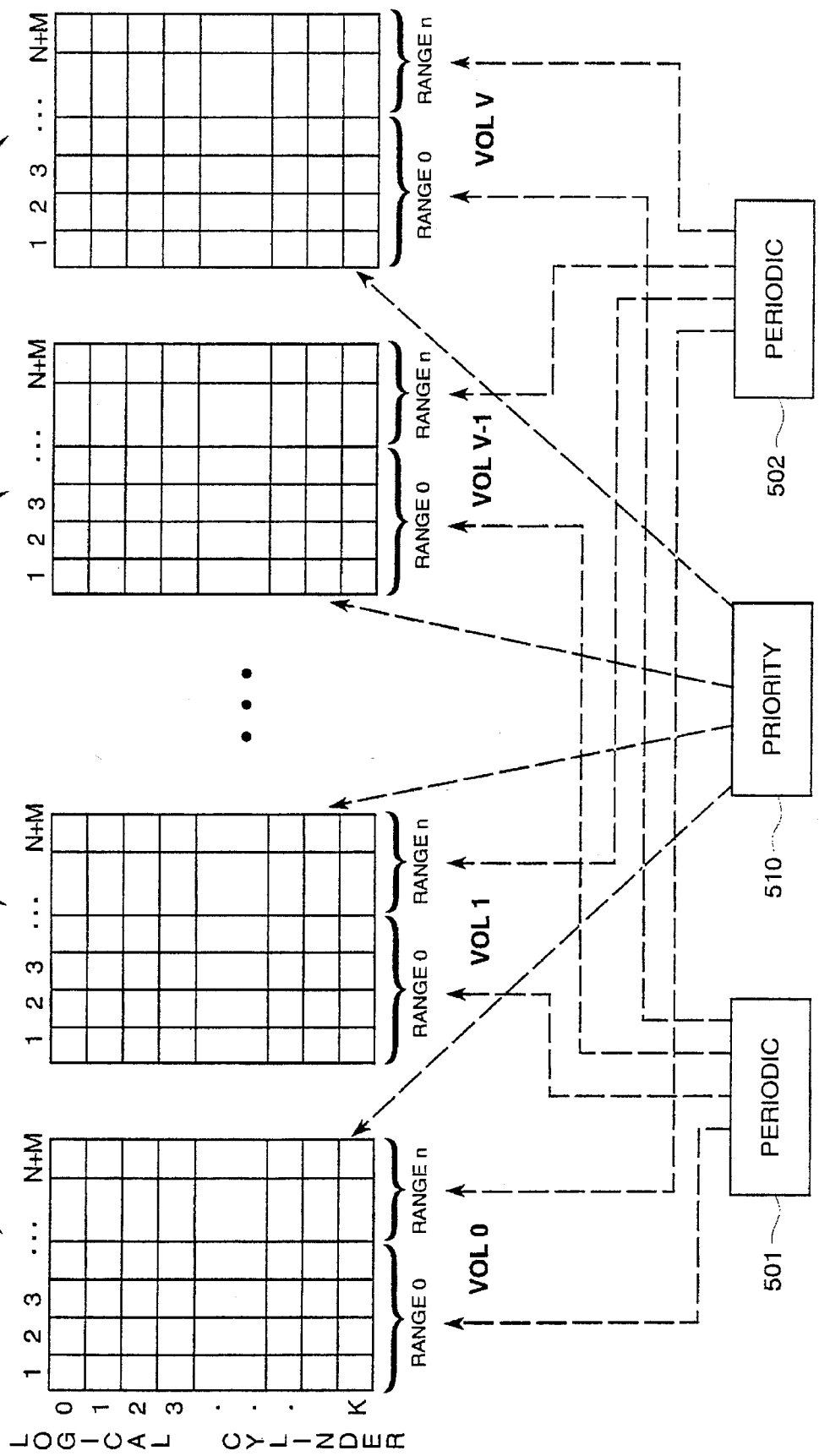
FIG. 5 illustrates the memory space of the data storage subsystem as viewed by the disk scrub operations.

In operation, the memory space in disk drive subset of 103-1 FIG. 1, of data storage subsystem 100 is divided into a plurality of substantially equal-sized partitions according to a predetermined ordering. The partitioning of the memory space is a matter of administrative choice, and one such partition is illustrated in FIG. 5 wherein the plurality of disk drives in data storage subsystem 100 are partitioned by volume number VOL O through VOL V and cylinder number O through K. Each volume consists of N+M physical devices forming an N+M redundancy group. It is apparent that alternate partitions are possible.

The periodic disk scrubbing functionality further partitions each volume into n device range partitions, dividing the number of physical devices assigned to that volume approximately equally among the n device range partitions. Each of independent disk scrubbing procedures 501, 502 . . . manages disk scrubbing for one of said device range partitions on all configured volumes. Each of the at least one periodic disk scrubbing procedures 501, 502 manages disk scrubbing for one of these partitions while another operationally independent priority disk scrubbing procedure 510 is available to sequence through the entire memory space, on all devices of all configured volumes in which data has newly been written since the last scrubbing operation was performed on that memory space. If the workload so dictates, a plurality of concurrently operational priority scrubbing procedures 510 can be used, but for simplicity of description, the preferred embodiment discloses n+1 processes, consisting of n periodic disk scrubbing procedures 501, 502 and 1 priority disk scrubbing procedure 510.

The number of periodic disk scrubbing procedures and the corresponding number of device range partitions, n, is determined by the amount of disk scrubbing work to be performed within one periodic scrub cycle. The number of periodic disk scrubbing procedures 501, 502 is selected to minimize the number of parallel processes and yet have sufficient processes to scrub all the disk drives in data storage subsystem 100 within the nominal cycle time. In addition, the number of processes is selected to minimize the performance impact on the data storage subsystem 100 while satisfying the reliability requirements noted above. Furthermore, the number of periodic disk scrubbing procedures can be dynamically adjusted to meet the above requirements, as the subsystem is reconfigured to increase or decrease the number of configured volumes.

The partitioning of devices within volumes into device ranges, and the corresponding assignment of periodic disk scrubbing processes to device ranges enables concurrent disk scrubbing execution on multiple physical devices and yet avoids the delays occasioned by multiple processes attempting to access the same disk drive. It is apparent that other means of partitioning are possible, such as partitioning by redundancy group or volume.

Figure 9:
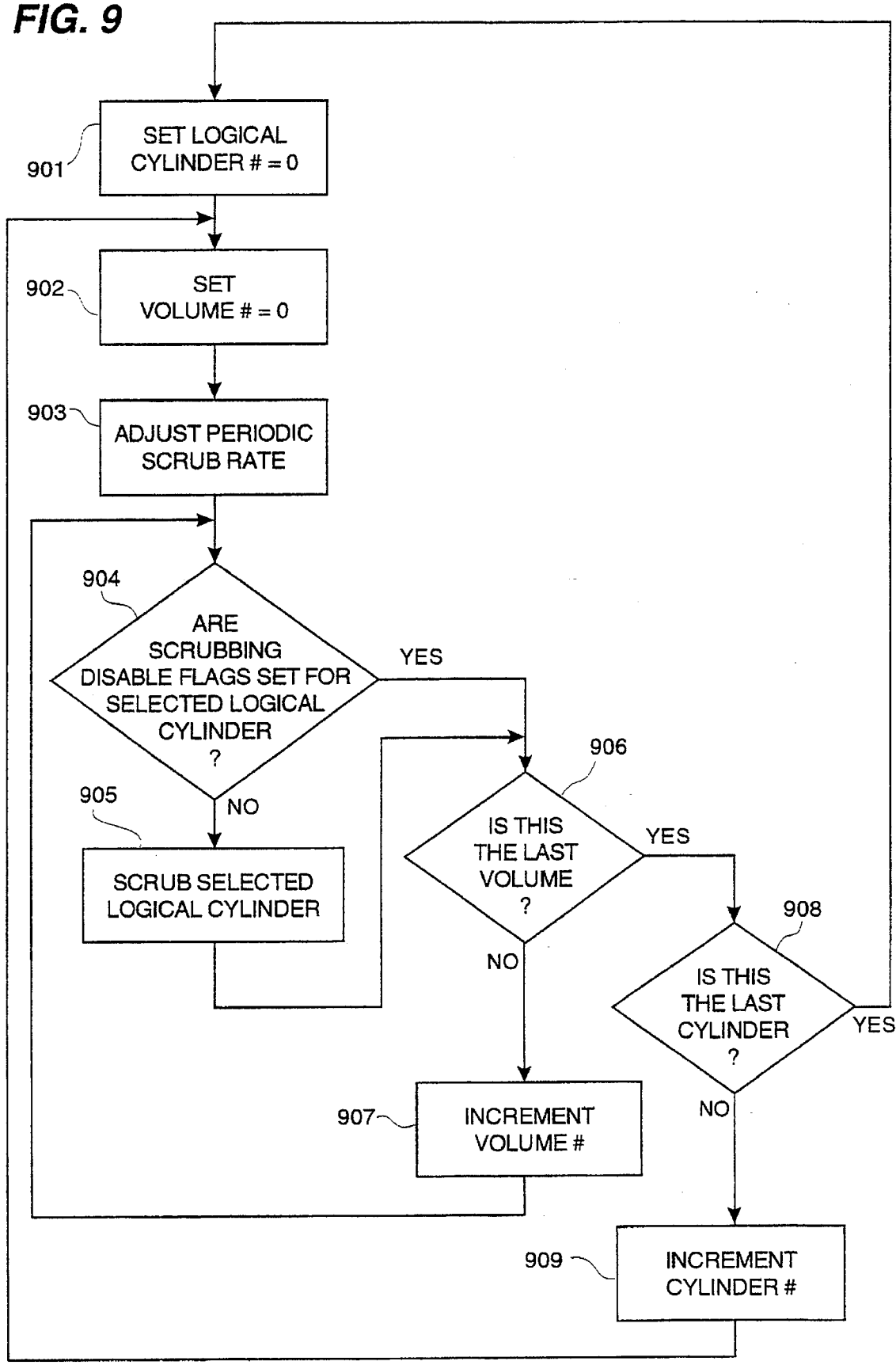
FIG. 9 illustrates in flow diagram form the operation of the periodic disk scrubbing operation.
Figure 10:
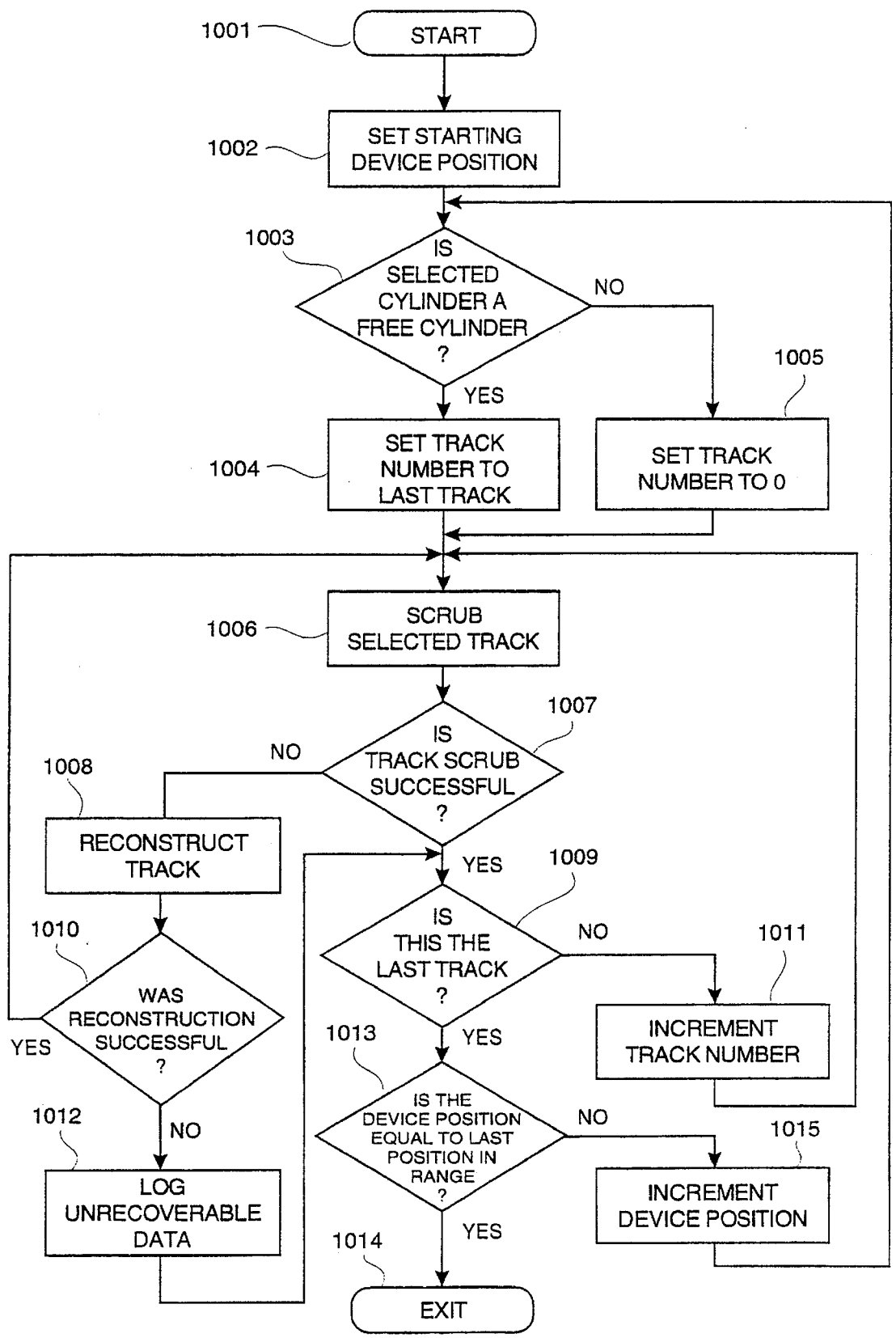
FIG. 10 illustrates in flow diagram form the operation of the logical cylinder scrubbing operation.
Figure 11:
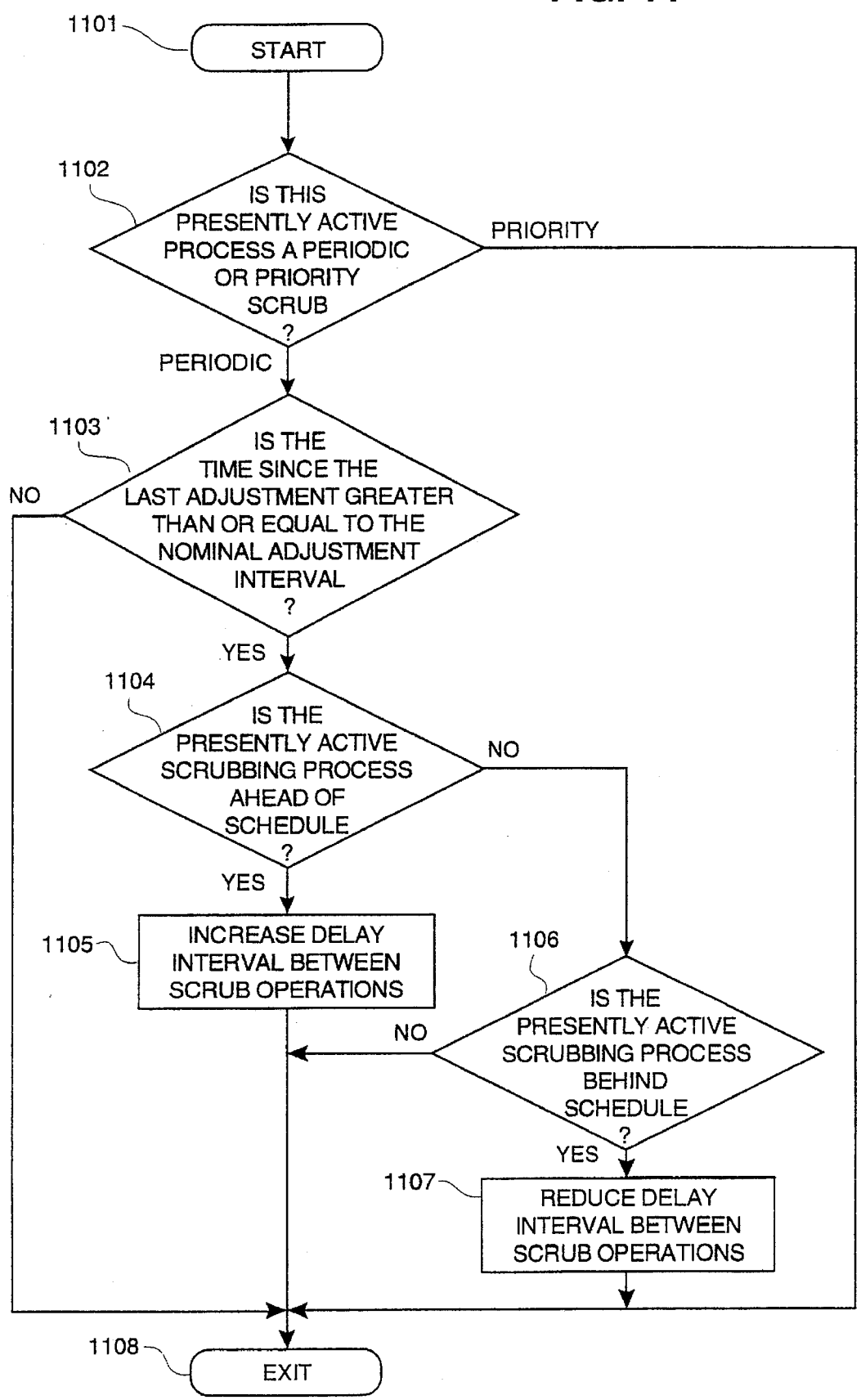
FIG. 11 illustrates in flow diagram form the operation of the periodic scrub rate adjustment operation.

The periodic disk scrubbing procedures 501, 502 function to sequence through all of their device range partitions on all of the configured volumes for a selected cylinder before proceeding to initiate the scrubbing operation for the next cylinder. This can be seen by reference to the memory map of FIG. 5, as described above. The operation of the periodic disk scrubbing procedures 501, 502 is illustrated in flow diagram form in FIG. 9, with additional details being disclosed in FIGS. 10–12. The periodic disk scrubbing procedure (ex-501) begins a step 901 where the cylinder number is set to 0. At step 902, the volume number is set to 0.

Adjust Periodic Scrub Rate

As the periodic disk scrubbing procedure 501 processes all the cylinders in the partition, the processing time can vary over segments of this partition, and over various iterations of the periodic disk scrubbing procedure over the same partition. It is desirable to evenly distribute the processing load of the concurrently operational disk scrubbing procedures 501, 502 over the length of the period. Therefore, step 903 checks the rate of processing the scrub operation and makes whatever adjustments are warranted. The details of this operation are disclosed in FIG. 11, where the process in initiated at step 1101. At step 1102, the rate adjustment process determines whether the presently active scrubbing operation is a periodic or priority scrub procedure. If it is a priority disk scrubbing procedure 510, then processing exits at step 1108, since there is no adjustment of a cycle time that is necessary. If the presently active disk scrubbing procedure is a periodic one, at step 1103 the time since the last adjustment is measured and compared to a nominal value, or predetermined threshold. If the elapsed time is not greater than the nominal time, processing exits at step 1108 since it is not time to adjust the scrub rate. If, at step 1103, the time since the last adjustment time is greater than or equal to the nominal adjustment interval, at step 1104, a determination is made whether the presently active scrubbing process is ahead of schedule. If it is, at step 1105 the delay between scrub operations is increased to return to a nominal cycle time. If, at step 1104, it is determined that the presently active scrubbing process is not ahead of schedule, processing advances to step 1106 where a determination is made whether the presently active scrubbing process is behind schedule. If it is not, the presently active scrubbing process is on schedule and processing exits at step 1108. If an adjustment is warranted, at step 1107 the delay between scrub operations is decreased to return to a nominal cycle time.

At step 904, the initialization procedures are completed by determining whether the selected logical cylinder should be scrubbed. Each volume in the data storage subsystem 100 is listed in the logical cylinder table as described above. Included in the logical cylinder table are flag bits indicative of the disk scrubbing status of the associated logical cylinder in this particular volume. The flag bit C stored in the logical cylinder table indicates whether data has been written onto the logical cylinder and requires priority scrubbing. If the logical cylinder is flagged for priority scrubbing, the periodic scrubbing procedure 501 skips this logical cylinder and advances to step 906, as is described below, and the priority scrubbing procedure 510 processes this logical cylinder. Other flag bits T can be used to indicate whether this logical cylinder should not be scrubbed now because it is presently active due to data being written onto the logical cylinder or this logical cylinder is being free space collected or is being reconstructed due to a data error. If the logical cylinder is presently utilized for one of these operations, the presently active periodic disk scrubbing procedure 501 skips this logical cylinder and does not scrub it until the next cycle of periodic disk scrubbing. An alternative to the flag bits is, for example, a queue that can be maintained in memory to list the logical cylinders having been written and to be priority scrubbed. Such a queue can take up a significant amount of memory but can be used as a FIFO for priority scrubbing of logical cylinders in the order in which they are written.

Scrub Selected Logical Cylinder

If no scrubbing disable flags are set, at step 905 the selected logical cylinder is scrubbed. This operation is detailed in the flowchart of FIG. 10 where the process is initiated at step 1001. At step 1002, the starting device position is designated as the first device position in the device range and at step 1003 a determination is made whether this selected logical cylinder is a free cylinder. If it is, at step 1004, the track number is set to the last track, since there is no virtual track data in a free cylinder to be scrubbed, but there is administrative data in the last track, and processing advances to step 1006. If the selected logical cylinder is not a free cylinder, at step 1005, the track number is set to 0 and processing advances to step 1006. At step 1006, the selected track is scrubbed.

Track Scrubbing Process

Figure 12:
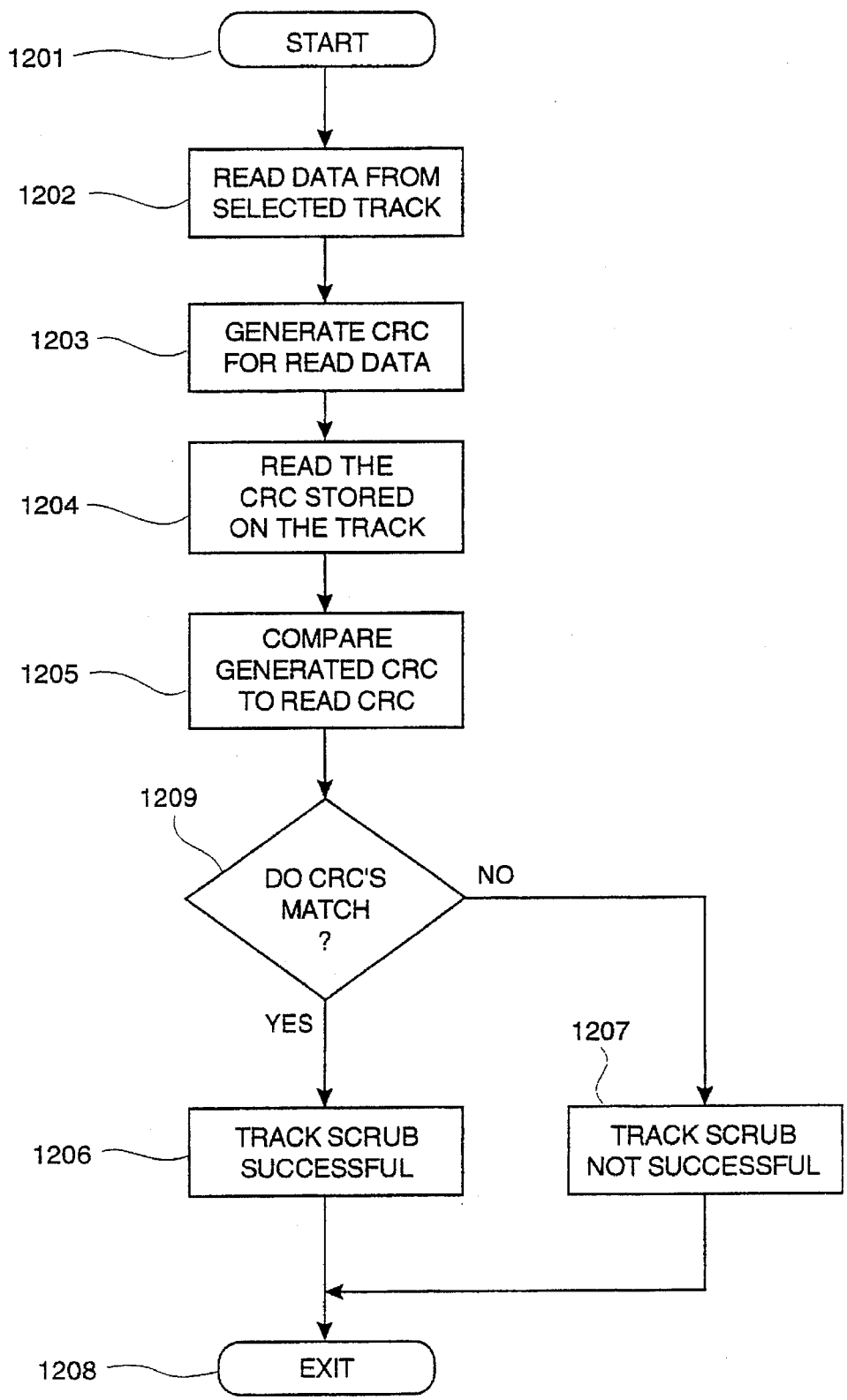
FIG. 12 illustrates in flow diagram form the operation of the track scrubbing operation.

The flowchart of FIG. 12 details the operation of the track scrubbing operation. This process is initiated at step 1201 and at step 1202 the data is read from the selected track. The hardware and software in the disk drive subassembly typically performs the track read and verify operation. Thus, the data that is read from the selected track is processed by generating a cyclic redundancy code CRC over this data at step 1203. At step 1204, the previously generated CRC is read from the track and at step 1205 compared to the presently generated CRC. If the two sets of CRC data match, then there are no errors in the data read from the selected track and processing advances to step 1206 where a successful scrub is acknowledged and processing exits at step 1208. If there is a mismatch between the two sets of CRC data, the presence of an error is noted at step 1207 and processing exits at step 1208.

At step 1007 of the logical cylinder scrubbing process, the results of the track scrubbing operation are reviewed. If there is an error noted in this track, processing advances to step 1008 where the reconstruct track process is activated. This operation uses the volume number, device position number, cylinder number and track number to specify the location of the data read error and thereby attempts to reconstruct correct track data from redundancy data on the corresponding tracks of the other drives in the redundancy group. At step 1010 the results of the reconstruction operation are reviewed and, if successful, the selected track is re-scrubbed by returning to step 1006. This process repeats until the track scrubbing operation is successful or at step 1010 an unrecoverable error is detected. The presence of an unrecoverable error is logged at step 1012 and processing advances to step 1009, as does the result of a successful track scrubbing operation as noted at step 1007. At step 1009, a determination is made of whether this is the last track in the selected logical cylinder. If not, at step 1011 the track number is incremented and processing returns to step 1006. This process, steps 1006–1011, repeat until the last track in the selected logical cylinder is reached, at which time processing advances to step 1013 where it is determined whether this device position is the last device position in the device range partition. If it is not, the device position number is incremented and processing returns to step 1003. Steps 1003–1013 are repeated until all of the device positions in the device range partition are scrubbed for this selected logical cylinder number, at which time processing exits at step 1014 and processing returns to step 906.

Once the entire logical cylinder has been scrubbed, at step 906 a determination is made whether this is the last volume in the partition. If it is not, the volume number is incremented at step 907 and processing returns to step 904. If the last volume in the partition has been reached, processing advances from step 906 to step 908 where a determination is made of whether this selected cylinder is the last cylinder. If not, the cylinder number is incremented at step 909 and processing returns to step 902. The processing of successive logical cylinders repeats until at step 908 it is determined that the last logical cylinder in the partition has been scrubbed, and processing then returns to step 901 to repeat the entire cycle of disk scrubbing.

As can be seen from this description of the periodic disk scrubbing procedure 501, the processing of scrubbing tasks is a nested process, with segments of memory at one level being processed across the span of the partition before the next collection of memory segments are processed. The nesting philosophy identified above is obviously just one of the many orderings that can be implemented and is simply illustrative of the periodic disk scrubbing procedure.

Priority Disk Scrubbing

Figure 13:
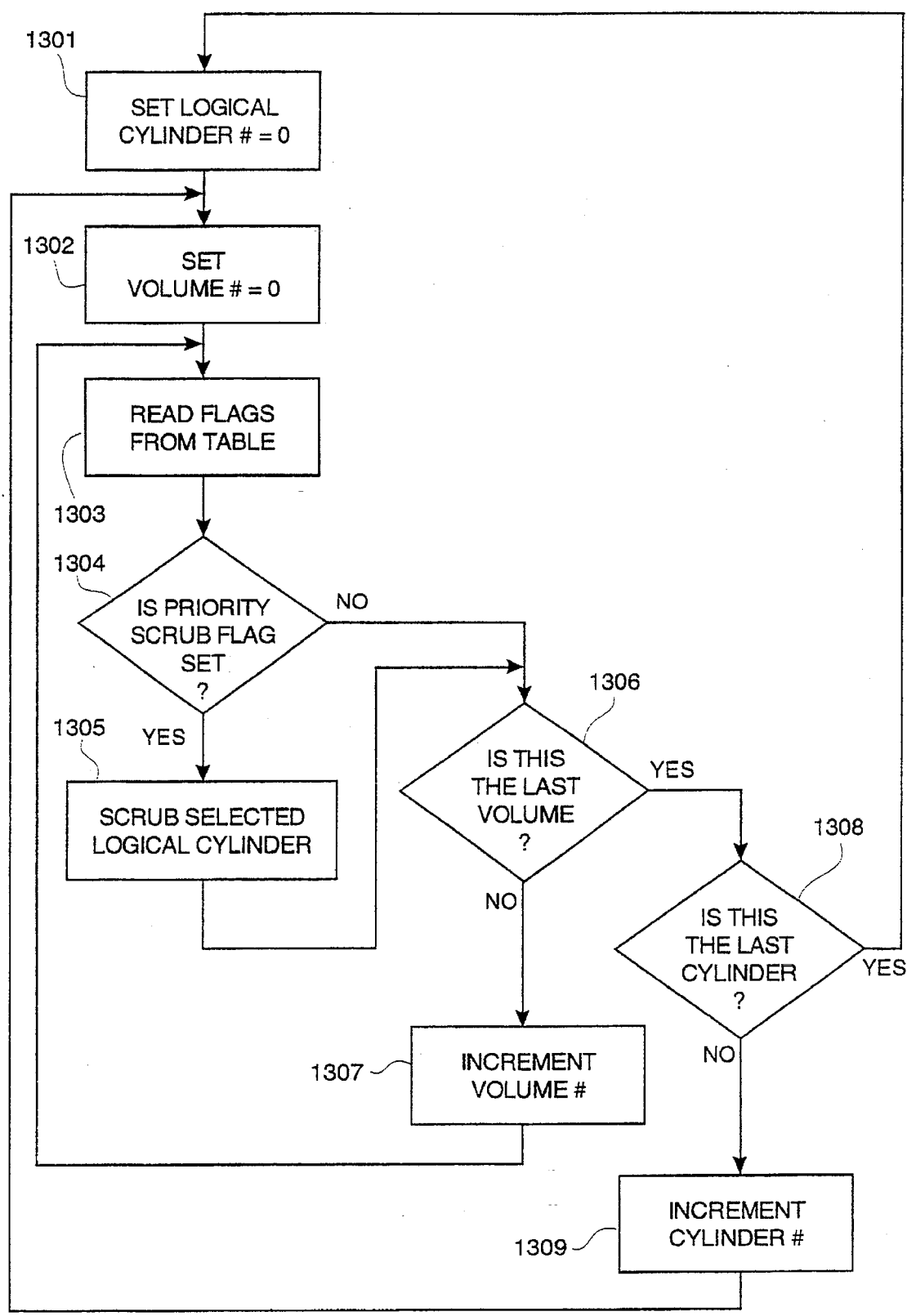
FIG. 13 illustrates in flow diagram form the operation of the priority disk scrubbing operation.

The priority disk scrubbing procedure 510 operates in much the same fashion as the above-described periodic disk scrubbing procedures 501, 502, with the exception that the selection of the cylinders to be scrubbed is based on the status of the priority scrub flag bit in the logical cylinder table. This procedure is disclosed in flow diagram form in FIG. 13. The priority disk scrubbing process sequences through all cylinders on all volumes, checking the status of the priority scrub flag in the logical cylinder table. Each time a priority disk scrub flag is found set in the logical cylinder table, priority disk scrubbing process proceeds to scrub that identified logical cylinder. This procedure is initiated at step 1301 where the cylinder number is set to 0. At step 1302, the volume number is also set to 0 and the scrubbing operation begins at step 1303 where the priority scrub flag bit for this cylinder is read from the logical cylinder table. At step 1304, a determination is made of whether the priority scrub flag is set. If it is not, processing advances to step 1306 where a determination is made of whether this is the last volume in this partition. If it is, processing advances to step 1308 where the cylinder number is reviewed to determine whether this is the last cylinder in the partition. If it is, processing returns to step 1301. If this is not the last cylinder, at step 1309 the cylinder number is incremented and processing returns to step 1302.

If at step 1304, the priority scrub flag is set and none of the other scrubbing disable flags are set, the priority disk scrubbing process 510 scrubs the selected cylinder at step 1305 as described above in reference to FIGS. 10 and 12. Once the selected logical cylinder is scrubbed, a determination is made at step 1306 whether the selected volume is the last volume in the partition. If not, the volume number is incremented at step 1307 and processing returns to step 1303. The successive volumes are priority scrubbed until the last volume is scrubbed, at which time processing advances from step 1306 to step 1308 where a determination is made whether the selected cylinder is the last logical cylinder in the partition. If it is not, the cylinder number is incremented at step 1309 and processing returns to step 1302. The successive cylinders in the partition are priority scrubbed until the last cylinder is processed. Once the last cylinder is scrubbed, processing advances from step 1308 to step 1301 where the priority disk scrubbing procedure 510 begins its cycle again.

If there is only a single priority disk scrubbing procedure 510 in the data storage subsystem 100, the partition encompasses the entirety of the memory space. The starting device position as illustrated in FIG. 5 is position O, while the last device position is N+M. Similarly, the logical cylinders range from O to K and the volumes range from O to V.

While a specific embodiment of this invention has been disclosed herein, it is expected that those skilled in the art can design other embodiments that differ from this particular embodiment but fall within the scope of the appended claims.

We claim:

1. A data storage subsystem that receives data from at least one connected data processor and stores said data on a plurality of disk drives divided into a plurality of logical partitions, said logical partitions comprising dedicated partitions currently storing data and free partitions available to store data, said data storage subsystem comprising:

a memory controller independent of said plurality of disk drives comprising means for identifying said dedicated and said free partitions;

means for reading said memory controller to determine the identity of said dedicated partitions; and means responsive to said reading of said memory controller for periodically verifying the integrity of data currently stored in each of said identified dedicated partitions, said means for periodically verifying comprising:

means for reading data in each of said identified dedicated partitions;

means responsive to said reading of data from each said identified dedicated partition for generating error check information from said read data;

means responsive to said generation of said error check information for detecting errors in data in each said identified dedicated partition; and means responsive to said detection of errors for correcting said data containing errors.

2. The data storage subsystem of claim 1 further comprising error check data generated from data written on said disk drives and stored on said disk drives, said means for detecting comprises:

means for comparing said generated error check information with said error check data stored on said disk drives, a mismatch between said generated error check information and said error check data being indicative of an error in said read data.

3. The data storage subsystem of claim 1 wherein said means for periodically verifying verifies all said identified dedicated partitions on a periodic cycle basis, said means for identifying comprises:

means for storing data that indicates a mapping between each said logical partition and a physical segment of a corresponding disk drive; and means for recording at least one flag bit, corresponding to a one of said logical partitions and indicative of whether said one logical partition is verifiable in a presently active periodic cycle.

4. The data storage system of claim 1 further comprising:

means for noting an identification of each of said dedicated partitions in which data has been written since the data integrity of said dedicated partitions was last verified; and means for priority verifying integrity of data written in each of said noted dedicated partitions, wherein said means for priority verifying includes means for sequencing through all data in each of said noted dedicated partitions to verify the integrity of data written in each said noted dedicated partition.

5. The data storage subsystem of claim 1 further comprising:

a plurality of disk drives for storing data, a number of said disk drives being configured into at least one redundancy group, each said at least one redundancy group including N+M of said plurality of disk drives, where N and M are both positive integers with N greater than 1 and M at least equal to 1;

means for storing a stream of data received from said at least one connected data processor on said N disk drives in a selected redundancy group; and means, responsive to storing of said data on all N disk drives in said selected redundancy group, for writing M segments of redundancy data, computed from said data stored on said N disk drives in said selected redundancy group, on to said M disk drives of said selected redundancy group.

6. The data storage subsystem of claim 5 wherein said means for periodically verifying verifies data written on to said N disk drives as well as data written on to said M disk drives in a redundancy group.

7. The data storage subsystem of claim 1 wherein said means for periodically verifying further comprises a plurality of operationally independent concurrently operational processes.

8. The data storage subsystem of claim 7 wherein said means for periodically verifying further comprises:

means for adjusting the number of said concurrently operational processes as a function of a number of said plurality of disk drives installed in said data storage subsystem.

9. The data storage subsystem of claim 1 further comprising:

means for reading said memory controller to determine the identity of said free partitions; and means responsive to said reading of said memory controller for periodically verifying the integrity of administrative data stored in each of said identified free partitions, said means for periodically verifying further comprising:

means for identifying administrative data stored in each of said identified free partitions;

means responsive to said identification of administrative data for reading said administrative data;

means responsive to said reading of said administrative data for generating error check information for said administrative data;

means responsive to said generation of error check information for detecting errors in administrative data for each identified free partition using said error check information; and means responsive to said detection of errors for correcting errors contained in said administrative data.

10. A data storage subsystem that receives data from at least one connected data processor and stores said data on a plurality of disk drives divided into a plurality of logical partitions, each of said logical partitions comprising at least two disk drives, said data storage subsystem comprising:

said logical partitions further comprising dedicated partitions currently storing data and free partitions available for storing data;

a memory controller independent of said plurality of disk drives comprising means for identifying said dedicated partitions and said free partitions;

means for locating memory space available to store data in said logical partitions;

means for receiving data from said at least one connected data processor;

means responsive to said receiving of data for selecting a memory space in said logical partitions capable of storing the received data;

means for writing received data into said selected memory space;

means responsive to said writing of data for updating said identifying means to indicate that said free partitions containing said selected memory space have changed to currently dedicated partitions;

means for reading said memory controller to determine the identity of said dedicated partitions; and means responsive to reading of said memory controller for periodically verifying the integrity of data currently stored in each of said identified dedicated partitions, said means for periodically verifying comprising:

means for reading data in each of said identified dedicated partitions;

means responsive to said reading of data from each said identified dedicated partition for generating error check information from said read data;

means responsive to said generation of said error check information for detecting errors in data in each said identified dedicated partition; and means responsive to said detection of errors for correcting said data containing errors.

11. The data storage subsystem of claim 10 further comprising:

means for recording at least one flag bit corresponding to each of said dedicated partitions in which data has been written since said each dedicated partition was last verified;

means for noting a state of said at least one flag bit of each of said dedicated partitions indicating that data has been written in a presently active periodic cycle; and means for priority verifying integrity of data written in said noted dedicated partitions, wherein said means for priority verifying includes means for sequencing through all data in each of said noted dedicated partitions.

12. The data storage subsystem of claim 11 wherein said priority verifying means further comprises:

means for altering said state of said at least one flag bit when a corresponding dedicated partition has been verified to indicate the data written in said corresponding dedicated partition has been verified in said presently active periodic cycle.

13. The data storage subsystem of claim 11 wherein said means for priority verifying operates concurrently with and independently of said means for periodically verifying.

14. The data storage subsystem of claim 10 further comprising:

means for reading said memory controller to determine said identity of said free partitions;

means responsive to said reading of said memory controller for periodically verifying the integrity of administrative data stored in each of said identified free partitions, said means for periodically verifying further comprising:

means for identifying administrative data stored in each of said free partitions;

means responsive to said identification of administrative data for reading said administrative data;

means responsive to said reading of said administrative data for generating error check information for said administrative data;

means responsive to said generation of error check information for detecting errors in administrative data of each said identified free partition using said error check information; and means responsive to said detection of errors for correcting errors contained in said administrative data.

15. A method for correcting data errors in a data storage subsystem that receives data from at least one connected data processor and stores said data on a plurality of disk drives divided into a plurality of logical partitions, said logical partitions comprising dedicated partitions currently storing data and free partitions available for storing data, the method comprising the steps of:

generating information identifying said dedicated partitions and said free partitions;

storing said generated information in a memory controller independent of said plurality of disk drives;

reading said memory controller to determine the identity of said dedicated partitions; and periodically verifying the integrity of the data stored in each of said identified dedicated partitions comprising the steps of:

reading data stored in each of said identified dedicated partitions;

generating error check information from said read data;

detecting errors in data stored in each of said dedicated partitions using said generated error check information; and correcting errors in said data stored in each said dedicated partition responsive to said detection of errors.

16. The method of claim 15 wherein each of said disk drives stores error check data generated from data written on said disk drives, said step of detecting errors comprises:

comparing said generated error check information with said error check data stored on said disk drives, a mismatch between said generated error check information and said error check data being indicative of an error in said read data.

17. The method of claim 15 wherein said step of periodically verifying verifies all said identified dedicated partitions on a periodic cycle basis, said step of identifying comprises:

storing data that indicates a mapping between a logical partition and a physical segment of a corresponding disk drive; and recording at least one flag bit corresponding to a one of said dedicated partitions and indicative of whether said one dedicated partition is verifiable in a presently active periodic cycle.

18. The method of claim 15 further comprising the steps of:

noting an identification of each of said dedicated partitions in which data has been written since the data integrity of each said dedicated partition was last verified; and priority verifying integrity of data written in each of said noted dedicated partitions by sequencing through all data in each of said noted dedicated partitions.

19. The method of claim 15, wherein said data storage subsystem includes a plurality of disk drives for storing data, a number of said disk drives being configured into at least one redundancy group, each said at least one redundancy group including N+M of said plurality of disk drives, where N and M are both positive integers with N greater than 1 and M at least equal to 1, said method further comprising the steps of:

storing a stream of data received from said at least one data processor on said N disk drives in a selected redundancy group;

writing M segments of redundancy data, said M segments generated from said data stored on said N disk drives in said selected redundancy group, on to said M disk drives of said selected redundancy group.

20. The method of claim 19 wherein said step of periodically verifying verifies data written on to said N disk drives as well as said M disk drives in a redundancy group.

21. The method of claim 15 wherein said step of periodically verifying comprises a plurality of operationally independent concurrently operational processes.

22. The method of claim 21 wherein said step of periodically verifying further comprises the step of:

adjusting the number of said concurrently operational processes as a function of a number of said plurality of disk drives installed in said data storage subsystem.

23. The method of claim 15 further comprising the steps of:

reading said memory controller to determine the identity of said free partitions; and periodically verifying administrative data contained in each of said free partitions responsive to said identifying of said free partitions, said step of periodically verifying further comprising the steps of:

identifying administrative data contained in each said identified free partition;

reading said administrative data stored in each identified free partition responsive to said identification of said administrative data;

generating error check information for said administrative data responsive to said reading of said administrative data;

detecting errors contained in said administrative data using said error check information; and correcting errors in said administrative data responsive to said detection of errors.

24. A method for correcting data errors in a data storage subsystem that receives data from at least one connected data processor and stores said data on a plurality of disk drives divided into a plurality of logical partitions, said logical partitions comprising dedicated partitions currently storing data and free partitions available to store data, said method comprising the steps of:

generating information identifying said dedicated partitions and said free partitions;

storing said generated information in a memory controller independent of said plurality of disk drives;

locating available memory space in said logical partitions;

receiving data from said at least one connected data processor;

selecting memory space from said located available memory space capable of storing said received data;

writing said received data into said selected memory space;

updating said generated information to indicate that said identified free partitions in which said received data was written have changed to currently dedicated partitions;

reading said memory controller to determine the identity of said dedicated partitions; and periodically verifying the integrity of data stored on each of said identified dedicated partitions, said periodically verifying step comprising the steps of:

reading data stored in each of said identified dedicated partitions;

generating error check information from said read data;

detecting errors in data stored in each of said dedicated partitions using said generated error check information; and correcting errors in data stored in each said dedicated partition responsive to said detection of errors.

25. The method of claim 24 further comprising the steps of:

recording at least one flag bit corresponding to each of said dedicated partitions in which data has been written since said each dedicated partition was last verified;

noting a state of said at least one flag bit of each of said dedicated partitions indicating that data has been written in a presently active periodic cycle; and priority verifying integrity of data written in each of said noted dedicated partitions by sequencing through all data in each of said noted dedicated partitions.

26. The method of claim 24 wherein said step of priority verifying further comprises:

altering said state of said at least one flag bit when a corresponding dedicated partition has been verified to indicate the data written in said corresponding dedicated partition has been verified in said presently active periodic cycle.

27. The method of claim 25 wherein said step of priority verifying operates concurrently with and independent of said step of periodically verifying.

28. The method of claim 24 further comprising the steps of:

reading said memory controller to determine the identity of said free partitions; and periodically verifying administrative data contained in each of said free partitions responsive to said identifying of said free partitions, said step of periodically verifying further comprising the steps of:

identifying said administrative data contained in each said identified free partition;

reading said administrative data stored in each identified free partition responsive to said identification of said administrative data;

generating error check information from said administrative data responsive to said reading of said administrative data;

detecting errors contained in said administrative data using said error check information; and correcting errors in said administrative data responsive to said detection of errors.

29. A data storage subsystem that receives data for at least one connected data processor and stores said data on a plurality of disk drives divided into a plurality of logical partitions, said logical partitions comprising dedicated partitions currently storing data and free partitions available for storing data, said data storage subsystem comprising:

a virtual track directory for mapping said plurality of logical partitions to corresponding physical segments on said plurality of disk drives;

a plurality of flag bits each corresponding to one of said logical partitions, stored in a memory controller independent of said plurality of disk drives, for identifying said dedicated partitions and free partitions;

means for reading each said flag bit to determine the identity of said dedicated partitions;

means responsive to said reading of each said flag bit for periodically verifying the integrity of data stored in each of said identified dedicated partitions, said verifying means comprising:

means for reading data in each of said identified dedicated partitions;

means responsive to said reading of data from each said identified dedicated partition for generating error check information from said read data;

means responsive to said generation of said error check information for detecting errors in data stored in each said identified dedicated partition; and means responsive to said detection of errors for correcting said data containing errors.

30. The data storage subsystem of claim 29 further comprising error check data stored on said disk drives and generated from data written on said disk drives, and said detecting means comprises:

means for comparing said generated error check information with said error check data stored on said disk drives, a mismatch between said generated error check information and said error check data being indicative of an error in said read data.

31. The data storage subsystem of claim 29 further comprising:

means for noting an identification of each of said dedicated partitions in which data has been written since the data integrity of said each dedicated partition was last verified; and means for priority verifying integrity of data written in each of said noted dedicated partitions, wherein said means for priority verifying includes means for sequencing through all data in each of said noted dedicated partitions.

32. The data storage subsystem of claim 29 further comprising:

a plurality of disk drives for storing data, a number of said disk drives being configured into at least one redundancy group, each said at least one redundancy group including N+M of said plurality of disk drives, where N and M are both positive integers with N greater than 1 and M at least equal to 1;

means for storing a stream of data received from said at least one data processor on said N disk drives in a selected redundancy group;

means, responsive to said storing of said data on all N disk drives in said selected redundancy group, for writing M segments of redundancy data, computed from said data stored on said N disk drives in said selected redundancy group, on to said M disk drives of said selected redundancy group.

33. The data storage subsystem of claim 32 wherein said means for periodically verifying verifies data written on to said N disk drives as well as data written on to said M disk drives in a redundancy group.

34. The data storage subsystem of claim 29 wherein said means for periodically verifying comprises a plurality of operationally independent concurrently operational processes.

35. The data storage subsystem of claim 34 wherein said means for periodically verifying further comprises:

means for adjusting the number of said concurrently operational processes as a function of a number of said plurality of disk drives installed in said data storage subsystem.

36. The data storage subsystem of claim 29 further comprising:

means for reading said flag bits to identify said free partitions;

means responsive to said reading of said flag bit for periodically verifying the integrity of administrative data stored in each of said identified free partitions, said means for periodically verifying further comprising:

means for identifying said administrative data stored in each of said identified free partitions;

means responsive to said identification of said administrative data for reading said administrative data;

means responsive to said reading of data for generating error check information from said administrative data;

means for detecting errors in said administrative data using said error check information; and means responsive to said detection of errors for correcting errors contained in said administrative data.

* * * * *